Patented May 26, 1925.

1,538,890

UNITED STATES PATENT OFFICE.

MARK N. FREDENBURGH, OF EAST ORANGE, NEW JERSEY, ASSIGNOR TO WESTING-HOUSE LAMP COMPANY, A CORPORATION OF PENNSYLVANIA.

INK FOR GLASS.

No Drawing.  Application filed March 31, 1923. Serial No. 629,174.

*To all whom it may concern:*

Be it known that I, MARK N. FREDENBURGH, a citizen of the United States, and a resident of East Orange, in the county of Essex and State of New Jersey, have invented a new and useful Improvement in Inks for Glass, of which the following is a specification.

This invention relates to inks, and more particularly to a special ink which may be applied to a glass surface, such as the envelope of an incandescent lamp, to produce thereon, opaque monograms and the like.

An object of my invention is to produce an ink which may be employed to produce opaque monograms, or the like, on a hard smooth surface, such as glass.

Another object of my invention is to provide an ink which, upon the application of heat, is transformed into a dense, opaque mass resistant to abrasion, and firmly adherent to a smooth surface, such as glass.

Another object of my invention is to combine a pigment and enamel or appropriate compound with a suitable vehicle to produce an ink which, upon heating and after application to a dense smooth surface, becomes firmly adherent, opaque, and resistant to abrasives.

Another object of my invention is to provide a pigment for an ink suitable for producing opaque monograms, filigree work, and the like.

In the manufacture of glassware and articles of vitreous material, it is desirable to form on the articles, either ornamental designs to enhance the beauty thereof or to place thereon, in a more or less inconspicuous position, the monogram, trade mark of the maker or other desired markings. Various methods have been devised for accomplishing this end, one of which involves the formation of the mold in which the glassware or vitreous ware is produced with a design corresponding to that desired. Another method involves the application to the surface by means of stencil or by hand, enamels which, upon baking, set into dense masses.

The first process is not suitable for ornamenting glassware with materials which are opaque or of different color from that of the material upon which they are placed but is only suitable for producing, in the glassware itself, depressions or raised sections of the design. In the second process, the labor employed is of the highest skill and, frequently, in very delicate work requiring intricate designs, artists of considerable ability are required. This work is done by hand, in view of which it is applicable only to very expensive articles.

Neither of the foregoing processes is suitable for articles which are sold at a relatively low cost, for example, such as incandescent lamps, tableware and the like, for the reason the cost of production would be considerably increased by applying to such articles a desired design or the monogram or trade mark of the maker. Furthermore, the molding process is not applicable, because, in the manufacture of the bulbs, they are rotated in the molds.

Furthermore, in the manufacture of incandescent lamps, tumblers, etc. on an automatic basis, it is desired to produce thereon, a monogram which includes the trade mark of the maker, size of the article, the voltage of the lamp, if the article is a lamp, etc. Various processes have been employed to produce such a monogram or mark; among these being etching, sand blasting, etc. In these processes, the monogram is produced by the materials employed acting physically or chemically on the glass. The objection has been made to the employment of these processes in that defective results are obtained or that the material endangered the health of the operators. In each of these processes separate apparatus and independent operators are required for producing the monograms, marks or designs thereby.

In order to avoid the employment of extra operators and machines for producing such monograms, it has been suggested that they be applied by printing on the glass, such printing to be performed by the automatic machines employed in performing some operation on the article, or, in the manufacture of incandescent lamps, by the machine which is used for sealing the mount within the lamp. No satisfactory ink, however, has been found which will produce, by means of a rubber-stamp printing press, an impression on the article which is resistant, legible, firmly adherent and opaque. Among the inks which have been proposed for printing on incandescent electric lamp bulbs, are those containing a low-melting-point-glass enamel in the finely divided state and intimately mixed with an oil. The enamel, after being impressed upon the bulb, is burned therein by the heat encountered during the passage of the bulb through the sealing-in machine, and, more particularly, as the same passes the sealing-in fires. One of the reasons why these inks have not proved satisfactory, is because the heat of the sealing-in machines is too low to completely burn in the enamel and thereby render it sufficiently resistant to abrasion, and also to the fact that the monograms are more or less translucent and do not stand out clearly from the transparent glass surface upon which they are placed. Another difficulty experienced was that the oil employed upon heating, left a residual carbon which was not completely oxidized upon passage of the bulb through the flames, leaving a more or less black monogram.

In order to remedy the defect of translucence, it has been proposed to add auxiliary ingredients, such as stannic oxide, powdered aluminum, calcium phosphate, cryolite, calcium fluoride, zirconium oxide, thorium oxide and the like; the object being to furnish greater opacity to the monogram. It was found however, that these ingredients require an increase in temperature in order to bake the same into the glass. This temperature increase was found to be so great as to result in injury to the lamp.

In order to attain the objects which have been set forth, and overcome the objections which are inherent in the present methods and materials, I have discovered a mixture, hereinafter termed the pigment, which, when properly combined with a fluid mixture, hereinafter termed the vehicle, will produce a suitable ink for printing impressions on glass bulbs and the like by means of a rubber stamp, which impressions during the sealing-in operation in the case of incandescent lamp bulbs, or upon the application of suitable heat, may be converted at a relatively low temperature (400° to 500° C.), to a brilliant white opaque monogram which is extremely resistant to removal by abrasion.

In order that those skilled in the art may be enabled to practice my invention, I shall now set forth in more specific terms, the constituents of a suitable ink which I have satisfactorily employed for the purpose mentioned and also I shall explain, in detail, the method practiced by me for obtaining this ink in a suitable condition for printing by means of a rubber stamp.

The ink may consist of a pigment and a vehicle or fluid mixture, the former, i. e., the pigment comprising an intimate mixture of argentic oxide and lead borate in the proportion of about 70% of the former to approximately 30% of the latter. The lead borate, when heated to between 400° and 500° C., readily fuses into a colorless glass which firmly adheres to a glass surface. Argentic oxide, when heated to between 250° and 300° C., is completely decomposed into metallic silver and oxygen, the silver being capable, at a higher temperature, about 500° C. of firmly adhering to a glass surface without the aid of any other combining agent.

When the pigment, which is composed of argentic oxide and lead borate, is heated to between about 400° and about 500° C., after having been applied to a glass surface, the large amount of metallic silver produced, will be found to be distributed through the molten glass of lead borate and thus produces great opacity in the resultant mixture, such mixture possessing a metallic white appearance. The oxygen, which is liberated during this heating, causes, in the presence of the gas flames of the sealing-in machine or other fires, a local rise in temperature which helps considerably in baking in the mixture and also the oxidation of the residual carbon resulting from the burning of the oils of the vehicle which is about to be described.

The pigment, which has been described more fully above, is preferably carried in an organic vehicle which may consist of a mixture of gum damar about 50%, and raw linseed oil about 50%, or, preferably, about 35% of glycerol $(C_3H_5(OH)_3)$. In order to print successfully on a glass surface by means of a rubber stamp, the ink used must have great tack and a heavy body. Gum damar is employed to obtain this tack while linseed oil is used as the diluting agent. Glycerol when used alone, imparts the desired characteristics to the ink which enable it to be applied successfully to a glass surface. Other vehicles, such as castor oil, have been successfully employed in the mixture, however, I have found that greater brilliancy in the finished monogram is obtained with glycerol or with a vehicle composed of gum damar and linseed oil.

The process employed by me in mixing the above ingredients should preferably be practiced in order to secure an ink which has considerable smoothness. According to this process, equal parts by weight of the vehicle, when gum damar and linseed oil are employed, and of the pigment are milled in a ball mill jar for approximately 15 hours. If glycerol is employed, the percentage by weight may be approximately 35%.

Because of the high viscosity of the vehicle when gum damar is used, it is preferable to add to the mixture, to enhance the milling operation, a quantity of benzol which may equal one part by volume of the benzol to one part by weight of the vehicle. After the milling is completed, the resultant fluid should be heated, preferably on a steam bath, until the benzol is evaporated, the ink being constantly agitated by stirring during this operation.

If the printing is to be performed by rubber stamps, it may be found desirable to employ glycerol as the vehicle. In such case, the consistency thereof to enhance milling operations may be adjusted by adding methyl alcohol. The fluid or ink, after thorough ball milling is preferably placed in a vacuum oven and heated to about 60° C. to remove the alcohol. Generally the temperature and pressure should be maintained at such values as will satisfactorily effect the removal of the alcohol without harming the other ingredients of the ink. With a batch of 300 grams mixed in the proportions stated heretofore, the temperature should be about 60° C. and the heating continued for about 30 min., the pressure being adjusted accordingly, in accordance with knowledge available to those skilled in the art.

The ink produced by the foregoing process will be found to possess the necessary qualities which enable it to be applied uniformly by means of a rubber stamp and, furthermore, upon heating, will produce a brilliant white opaque impression which is very resistant to abrasion.

Although I have specified particular ingredients which may be employed in manufacturing the ink enamel, it is obvious that one skilled in the art may employ substitutes which fall within the range of equivalents thereof, therefore, I contemplate including such materials as fall within the scope of my invention as defined in the appended claims.

What is claimed is:

1. An ink comprising a pigment composed of an intimate mixture of silver oxide and a low melting point enamel, and a vehicle containing a reducing agent which, on the application of heat, reduces the silver oxide to metallic silver.

2. An ink comprising a pigment and a vehicle, said pigment composed of an intimate mixture of an enamel capable of fusing into a colorless glass between about 400° to about 500° C. and of adhering to a glass surface and a compound capable of dissociation when heated to about 250° to 300° C. to form an opaque mass, said vehicle being a substance having sufficient tack and body to produce a good printing ink.

3. An ink comprising a pigment including an oxide decomposible below 500° C., an enamel, and an organic vehicle for supporting said pigment.

4. An ink comprising a pigment including an oxide capable of decomposing below 500° C., and an enamel capable of fusing at a temperature lower than the softening point of glass and a vehicle for carrying said pigment.

5. An ink comprising an easily decomposible metallic oxide, an enamel and a vehicle having sufficient tack and body to produce a good printing ink.

6. An ink comprising an intimate mixture of an easily decomposible metallic oxide, a low-fusing-point enamel and a vehicle.

7. An ink comprising an easily decomposible metallic oxide, a low-melting-point enamel and a vehicle including a gum and a diluting agent.

8. An ink comprising argentic oxide, lead borate and glycerol.

9. An ink comprising an intimate mixture of about 70% by weight of argentic oxide and about 30% by weight of lead borate, mixed in the proportion of about 65% by weight to about 35% by weight of glycerol.

10. An ink comprising equal parts, by weight, of a pigment consisting of about 70% of argentic oxide and about 30% of lead borate and a vehicle consisting of about 50% of gum damar and about 50% of raw linseed oil.

11. An ink comprising a metallic oxide, an enamel and a suitable organic vehicle, said oxide being capable of decomposing into an opaque body and oxygen the latter of which combines with the carbon of the vehicle.

12. An ink suitable for printing on vitreous articles comprising a metallic oxide decomposible to produce an opaque metallic body, a low fusing point enamel and a vehicle containing only a small amount of residual carbon on decomposition.

13. A pigment comprising a readily decomposible metallic oxide and lead borate.

14. A pigment comprising a mixture of argentic oxide and lead borate.

15. A pigment comprising argentic oxide and a low-fusing point enamel.

16. A pigment comprising a mixture of argentic oxide and lead borate in proportions of about 70% to 30%.

17. A pigment comprising an oxide decomposible at approximately 500° C. to produce an opaque mass and an enamel having a fusion point at approximately 500° C.

18. The process of producing a smooth ink which comprises intimately mixing a vehicle of relatively high viscosity and a pigment consisting of a metallic oxide and an enamel and adding to said material, during the mixing operation, a quantity of an easily vaporizing diluting agent, in the proportion of about two parts by volume to one part by weight of the vehicle, milling said mixture and then evaporating the diluting agent from the resultant fluid.

19. The process of producing a smooth ink which comprises ball-milling a mixture consisting of silver oxide, lead borate and glycerol, adding to the mixture to enhance the milling operation a diluting agent such as alcohol and thereafter heating the resultant fluid to remove the diluting agent.

In testimony whereof, I have hereunto subscribed my name this 30th day of March 1923.

MARK N. FREDENBURGH.